June 28, 1966　　　D. C. GILLESPIE　　　3,258,622
MAGNET RETAINERS FOR A DYNAMOELECTRIC MACHINE
Filed June 6, 1963
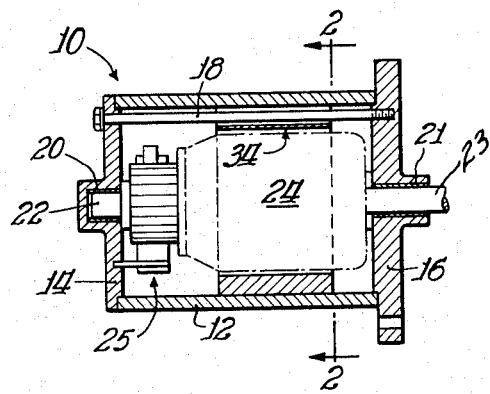
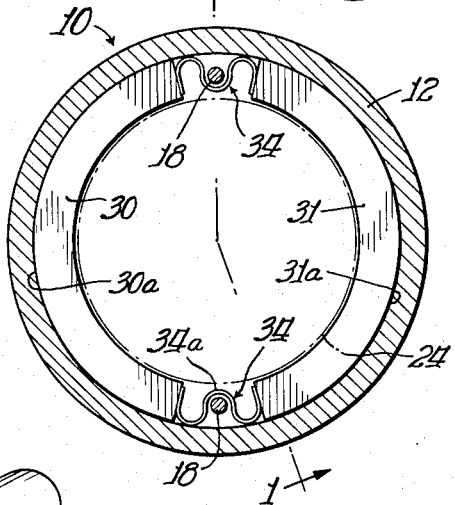
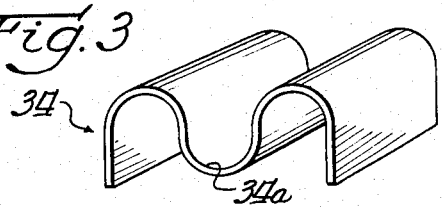
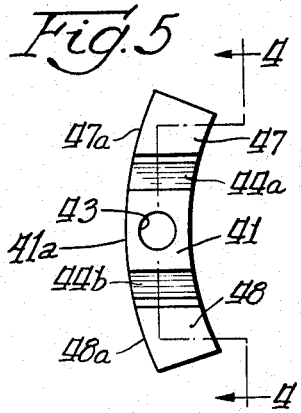
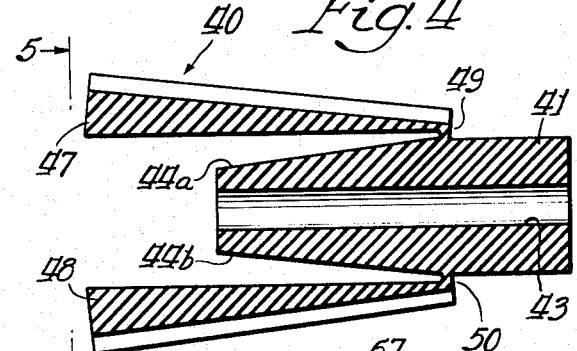
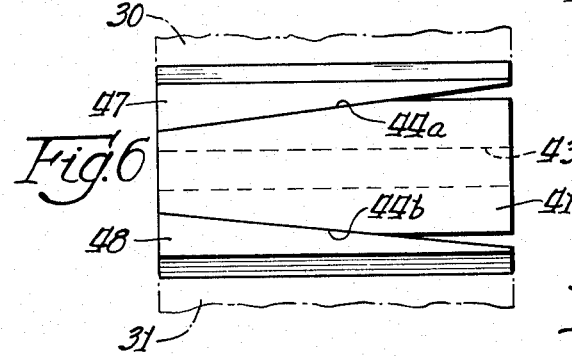
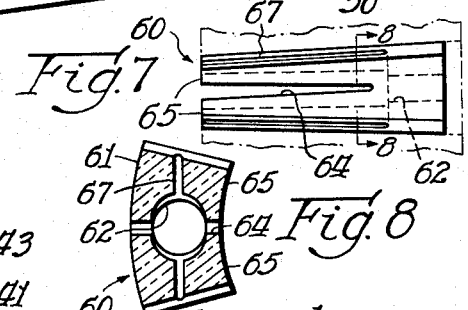
Inventor:
Daniel C. Gillespie
By: Thomas B. Hunter Atty.

United States Patent Office 3,258,622
Patented June 28, 1966

3,258,622
MAGNET RETAINERS FOR A DYNAMO-ELECTRIC MACHINE
Daniel C. Gillespie, Maywood, Ill., assignor to Borg-Warner Corporation, Chicago, Ill., a corporation of Illinois
Filed June 6, 1963, Ser. No. 285,922
4 Claims. (Cl. 310—154)

This invention relates to dynamoelectric devices having permanent magnet stators and more particularly to retaining means for securing said permanent magnet stators within the casing.

Because of advances in the technology of magnetic materials, it is now economically feasible to substitute permanent magnet stator elements for the conventional wound field coil stators in small electric motors and generators. The advantages to be gained by the use of permanent magnet stator materials include lower production costs, efficiency, lower heat losses, less noise, reduction in size and weight, and elimination of the necessity for internal fans and ventilation.

When permanent magnet stators are used in motors and the like, they are commonly mounted within the casing by adhesives or by conventional securing means such as machine screws, rivets, etc. The present invention has as a principal object to provide improved stator retainers which are inexpensive to manufacture and which facilitate rapid assembly and disassembly of the motors with lower production and maintenance costs.

Another object of the present invention is to provide improved stator retainers especially suited for the securing of permanent magnet stators within an electric motor or generator casing.

Another object of the invention is to provide magnet retainers which are insertable between the adjacent stator elements to separate and secure said stator elements by resiliently urging them against the inside surface of said casing.

It is another object of the invention to provide a stator securing element which is adapted to receive a fixed member to prevent relative rotation between the stators and the motor casing.

It is another object of the invention to provide an improved stator retainer in the form of a resilient insert acting as a spring to urge the stators apart and against the inside surface of the casing.

It is another object of the invention to provide a resilient, locking wedge adapted to be driven between adjacent stators.

It is still another object of the invention to provide a resilient, frangible wedging element adapted to be driven between two adjacent magnetic stator elements to resiliently urge them into engagement with the casing.

Other and more particular objects and advantages will be apparent from the following detailed description taken in conjunction with the appended drawings wherein:

FIGURE 1 is a cross sectional view of an electric motor having permanent magnet stator retainers embodying the principles of the present invention;

FIGURE 2 is a cross sectional view taken along the plane of line 2—2 of FIGURE 1;

FIGURE 3 is a detailed isometric view of a stator retainer used in the present invention;

FIGURE 4 is a cross sectional view taken along the plane of line 4—4 of FIGURE 5 of a modified stator retainer, prior to insertion into its operative position;

FIGURE 5 is a view taken along the plane of line 5—5 of FIGURE 4;

FIGURE 6 is a plan view of the retainer shown in FIGURES 4 and 5 in its operative position;

FIGURE 7 is a plan view of another embodiment of a stator retainer exemplifying the principles of the present invention; and FIGURE 8 is a cross sectional view taken along the plane of line 8—8 of FIGURE 7.

Referring now to FIGURE 1, an exemplary environment of the present invention is illustrated in the form of a small electric motor (or generator) designated generally by the numeral 10. The motor 10 includes a casing having a cylindrical shell 12, a base 16, and a closure member 14. The latter is secured by a series of elongated, relatively slender, fastening rods 18 threadably received within the base member 16.

A conventional wire-wound armature or rotor 24 (shown by dot-dash lines in FIGURES 1 and 2) is carried on a coaxially arranged shaft having a stub or terminal portion 22 journalled in a bearing 20 in closure member 14. The other end 23 of the shaft, which functions as the drive shaft for any device driven by the motor, is journalled in a bearing 22 in the base 16. The commutator assembly, designated generally by numeral 25, includes brushes engaging a commutator ring for supplying electrical energy to the rotor windings.

A pair of permanent magnet stator elements 30, 31, comprising segmental cylindrical sections and including surfaces 30a, 31a conforming to and complementarily engaging the inside surface of shell 12, are provided within motor casing. The width of the stator elements, which may be regarded as the extent of circumferential length covered by each element, is chosen so as to provide a small gap of about 20°–30° between the side edges of adjacent stators when they are positioned within the casing (see FIGURE 2).

An important aspect of the present invention relates to the manner in which the stators are secured in position within the casing. As best shown in FIGURE 2, stators 30, 31 are retained in a relatively fixed position within the motor case by retaining means in the form of resilient inserts 34, 34 adapted to urge the stators apart and into engagement with the motor casing. Each of the resilient inserts 34, in one embodiment of the invention, comprises a generally rectangular strip of resilient material, preferably metal, bent into a sinuous or M-shaped configuration (FIGURE 3). It will be noted that a space is provided between the central portion 34a of each insert and the casing. The fastening rods 18 extend through these spaces so that relative movement between the stators and the casing is prevented.

A second embodiment of the invention, shown in FIGURES 4 through 6, comprises retainer means adapted to be utilized in the substantially same manner as the resilient inserts 34 described above. As shown in FIGURE 4, retaining means 40 comprises a body member 41 including a cylindrical bore 43 extending axially therethrough to receive the fastening rods 18 in the environment illustrated in FIGURE 1, and tapered sides 44a, 44b. A pair of substantially identical leg members 47, 48, each having complementarily formed surfaces adapted to fit against tapered sides 44a, 44b, are connected to the body member 41 by small, frangible tie elements 49, 50 respectively.

The retainers (FIGURE 5) are formed with a convex face adapted to engage the inside surface of the motor casing, said face being defined by the arcuate conformation of surfaces 41a, 47a, and 48a on the body member and leg members respectively. During assembly of the motor, the permanent magnet stator elements 30, 31 are temporarily secured to the inside of the motor casing, and the retainers are inserted in the gap between the sides of said stators with the untapered end (the righthand end as viewed in FIGURE 4) of body member 41 entering first. As the retainers are pushed into position, leg members 47, 48 are urged downwardly toward the tapered sides 44a, 44b respectively. In order to firmly secure the retainer into position, the body member is moved relative to the leg members in a manner so as to break the frangible connecting elements 48, 49 permitting the body member to be forced into wedging relationship with the leg members. The final position assumed by these elements is illustrated in FIGURE 6.

Referring now to FIGURES 7 and 8, another embodiment of the present invention is illustrated, said embodiment comprising a bifurcated, wedge-shaped element 60 adapted to be inserted in the gap between two adjacent magnetic stator elements in the same manner described above. It will be noted that the use of this retainer would require that the edges of the stators be tapered with respect to the longitudinal axis thereof. The retainer itself is provided with a convex surface 61 adapted to conform with the inside surface of the motor casing and is, like the other embodiments described above, provided with a longitudinally extending bore 62 for the reception of the tie rods. In addition, the element is formed with a longitudinally extending slot 64 having a length of approximately two-thirds of the over-all length so as to define a pair of legs 65, 65 which are deformable and which, in resisting deformation, provide the necessary spring action to maintain the stators in position. Positioned at approximately right angles with respect to the slot, is another longitudinally extending slot 67 having a length approximately equal to said first slot.

Having thus far described the invention, it should be apparent that the present invention has provided new and useful improvements in permanent magnet retainers which are economical to manufacture and relatively simple to assemble. While this invention has been described in connection with certain specific embodiments thereof, it is to be understood that this is by way of illustration and not by way of limitation; and the scope of this invention is defined solely by the appended claims which should be construed as broadly as the prior art will permit.

What is claimed is:
1. In a dynamoelectric device:
a generally cylindrical casing enclosing a rotor;
at least two permanent magnetic stators positioned within said casing, said stators being characterized by having a surface generally conforming to the internal surface of said casing and being of such size and positioned so that a gap is provided between adjacent stators for the reception of retaining means; and
retaining means interposed between adjacent stators in the gap provided therebetween resiliently urging said adjacent stators apart and into firm engagement with said casing, said retaining means comprising at least one wedge-shaped, elongated insert having a tapered slot extending longitudinally thereof so as to provide a pair of deformable leg members on opposite sides of said slot whereby the resistance to deformation causes said insert to act as a spring under compression.

2. The combination as defined in claim 1 wherein said insert includes an additional longitudinally extending slot intersecting said tapered slot.

3. In a dynamoelectric device:
a generally cylindrical casing enclosing a rotor,
at least two permanent magnet stators positioned with the said casing, said stators having a surface generally conforming to the internal surface of said casing,
said stators being of such size and positioned so that a gap is provided between adjacent stators for the reception of retaining means, and,
retaining means interposed between adjacent stators in the gap provided therebetween resiliently urging said adjacent stators apart and into firm engagement with said casing, said retaining means comprising a bifurcated, wedge shaped insert acting as a spring under compression in its operative position between stator elements.

4. The combination as defined in claim 2 wherein said insert includes a longitudinally extending slot providing a pair of deformable, resilient leg members.

References Cited by the Examiner
UNITED STATES PATENTS

| | | | |
|---|---|---|---|
| 2,513,227 | 6/1950 | Wylie | 310—154 |
| 3,090,877 | 5/1963 | Baumhart | 310—154 |

MILTON O. HIRSHFIELD, *Primary Examiner.*

D. X. SLINEY, *Assistant Examiner.*